US011626962B2

(12) United States Patent
Pedersen (10) Patent No.: US 11,626,962 B2
(45) Date of Patent: Apr. 11, 2023

(54) INTER-GNB XN SIGNALING OF NR TDD RADIO FRAME CONFIGURATION AND CLI SENSITIVITY

(71) Applicant: NOKIA TECHNOLOGIES OY, Espoo (FI)

(72) Inventor: Klaus Pedersen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 57 days.

(21) Appl. No.: 17/250,095

(22) PCT Filed: Jun. 4, 2018

(86) PCT No.: PCT/FI2018/050417
§ 371 (c)(1),
(2) Date: Nov. 24, 2020

(87) PCT Pub. No.: WO2019/234285
PCT Pub. Date: Dec. 12, 2019

(65) Prior Publication Data
US 2021/0203466 A1 Jul. 1, 2021

(51) Int. Cl.
*H04L 5/00* (2006.01)
*H04L 5/14* (2006.01)
(Continued)

(52) U.S. Cl.
CPC .......... *H04L 5/0091* (2013.01); *H04L 5/0062* (2013.01); *H04L 5/1469* (2013.01); *H04W 72/0446* (2013.01); *H04W 72/0426* (2013.01)

(58) Field of Classification Search
CPC ... H04L 5/0091; H04L 5/0062; H04L 5/1469; H04L 5/0092; H04L 5/0035;
(Continued)

(56) References Cited

U.S. PATENT DOCUMENTS

2013/0336178 A1 12/2013 Tiirola et al.
2018/0367289 A1* 12/2018 Kim .................. H04L 5/0096
(Continued)

FOREIGN PATENT DOCUMENTS

WO 2014161592 A1 10/2014
WO 2018202956 A1 11/2018

OTHER PUBLICATIONS

International Search Report and Written Opinion for International Application No. PCT/FI2018/050417, dated Feb. 15, 2019, 16 pages.
(Continued)

*Primary Examiner* — Chae S Lee
(74) *Attorney, Agent, or Firm* — Brake Hughes Bellermann LLP (57) ABSTRACT

A method and an apparatus are described, by which a supported slot format information concerning radio frame configuration is prepared in form of a list in which supported slot formats for time division duplexing are listed, the supported slot format information is signaled to a network control device, used radio frame configuration information is prepared in form of a vector which has a length M which is the number of slots, wherein an i-th element of the vector indicates the used slot format in the i-th slot by a number indicating an entry in the list of the supported slot format information, wherein $1<=i<=M$, and the used radio frame configuration information is signaled to the network control device.

22 Claims, 4 Drawing Sheets (51) Int. Cl.
*H04W 72/04* (2009.01)
*H04W 72/0446* (2023.01)

(58) Field of Classification Search
CPC ......... H04W 72/0446; H04W 72/0426; H04W 92/20; H04W 72/042; H04B 7/2656
See application file for complete search history.

(56) References Cited

U.S. PATENT DOCUMENTS

2020/0112420 A1* 4/2020 Xu .................... H04W 72/0446
2020/0280388 A1* 9/2020 Shen ................. H04W 72/0446

OTHER PUBLICATIONS

3GPP TSG RAN WG1 #91, R1-1719706; "Dynamic TDD—SFI Handling and Interference Management"; Reno, Nevada, USA; Nov. 27-Dec. 1, 2017; 6 pages.

3GPP TS 38.211 V15.1.0; "3rd Generation Partnership Project; Technical Specification Group Radio Access Network; NR;-Physical channels and modulation' (Release 15)"; Mar. 2018; 90 pages.

First Examination Report for India Application No. 202047057113, dated Jan. 6, 2022, 9 pages.

Office Action for Japanese Patent Application No. 2020-567745, dated Jan. 24, 2022, 6 pages.

3GPP TSG RAN WG1 #89, R1-1708402; "Considerations on DL-UL Interference Coordination"; Source: CMCC; Agenda Item: 7.1.6.1; Hangzhou, China; May 15-19, 2017; 6 pages.

3GPP TSG-RAN WG3 #97bis, R3-173695; "Discussion on Coordination Between LTE and NR for LTE-NR Co-existence", Agenda item: 8 1; Source: ZTE; Prague, Czech; Oct. 9-13, 2017; 9 pages.

3GPP TSG RAN WG1 Meeting AH_NR#3, R1-1715398; "Dynamic and Semi-Static DL/UL Resource Partition"; Agenda Item: 6.3.1.6; Source: Huawei, HiSilicon; Nagoya, Japan; Sep. 18-21, 2017; 8 pages.

3GPP TS 36.423 V15.1.0; 3rd Generation Partnership Project; Technical Specification Group Radio Access Network; Evolved Universal Terrestrial Radio Access Network (E-UTRA); X2 Application Protocol (X2AP) (Release 15); Sophia Antipolis, Valbonne, France; Mar. 2018; 9 pages.

Office Action for Korean Application No. 10-2021-7000009, dated Jan. 8, 2022, 11 pages.

3GPP TS 38.211; V1.3.0; 3rd Generation Partnership Project; Technical Specification Group Radio Access Network; NR; Physical channels and modulation (Release 15), Sophia Antipolis, Valbonne, France; Dec. 2017, 73 pages.

Office Action for Japanese Patent Application No. 2020-567745, dated Aug. 8, 2022, 6 pages.

Office Action for Korean Application No. 10-2021-7000009, dated Aug. 19, 2022, 7 pages.

* cited by examiner

Table 4.3.2-3: Slot formats for normal cyclic prefix.

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56 – 255 | Reserved | | | | | | | | | | | | | |

Fig. 4

INTER-GNB XN SIGNALING OF NR TDD RADIO FRAME CONFIGURATION AND CLI SENSITIVITY

CROSS-REFERENCE TO RELATED APPLICATIONS

This application is a national stage entry of International Application No. PCT/FI2018/050417, filed Jun. 4, 2018, entitled "INTER-GNB XN SIGNALING OF NR TDD RADIO FRAME CONFIGURATION AND CLI SENSITIVITY" which is hereby incorporated by reference in its entirety.

TECHNICAL FIELD

Various example embodiments relate to an apparatus, a method and a computer program product by which inter-gNB Xn signaling of NR TDD radio frame configuration and CLI sensitivity can be achieved.

RELATED BACKGROUND ART

The following meanings for the abbreviations used in this specification apply:
CLI Cross link interference
CSI Channel state information
eIMTA Enhanced interference management and traffic adaptation
HARQ Hybrid automatic repeat request
IE Information Element
NR New radio
OAM Operations and maintenance
OFDM Orthogonal frequency division multiple access
SCS Sub carrier spacing
TDD Time division duplexing
UE User Equipment
URLLC Ultra-reliable low latency communications
Xn Interface between two gNBs
XnAP Xn application protocol Embodiments of the present invention, although not limited to this, relate to signaling a used radio configuration between two gNBs over the Xn interface.

SUMMARY OF THE INVENTION

Embodiments of the present invention address this situation and aim to provide measures for efficiently signaling a used radio frame configuration between two network control elements.

According to a first aspect an apparatus is provided which comprises at least one processor and at least one memory including computer program code, the at least one memory and the computer program code configured to, with the at least one processor, cause the apparatus at least to perform: preparing supported slot format information concerning radio frame configuration in form of a list in which supported slot formats for TDD are listed, signaling the supported slot format information to a network control device, preparing used radio frame configuration information in form of a vector which has a length M which is the number of slots, wherein an i-th element of the vector indicates the used slot format in the i-th slot by a number indicating an entry in the list of the supported slot format information, wherein $1<=i<=M$, and signaling the used radio frame configuration information to the network control device.

According to a second aspect, a method is provided which comprises: preparing supported slot format information concerning radio frame configuration in form of a list in which supported slot formats for TDD are listed, signaling the supported slot format information to a network control device, preparing used radio frame configuration information in form of a vector which has a length M which is the number of slots, wherein an i-th element of the vector indicates the used slot format in the i-th slot by a number indicating an entry in the list of the supported slot format information, wherein $1<=i<=M$, and signaling the used radio frame configuration information to the network control device.

The first and second aspects may be modified as follows:
For example, the supported slot formats in the list of the supported slot format information may be a subset from a plurality of predefined slot formats.

The number of supported slot formats in the supported slot format information may be N, and the number indicating an entry in the list of the supported slot format information may represented by digits, the number of which is the number of digits necessary for representing N.

Moreover, cross link interference sensitivity information, which indicates how sensitive the different slots are to cross link interference, may be prepared in form of a cross link interference sensitivity vector, the cross link interference sensitivity vector having a length M, wherein a k-th element of the cross link interference sensitivity vector indicates a cross link interference sensitivity in the k-th slot, wherein $1<=k<=M$, and the cross link interference sensitivity vector may be signaled to the network control device.

The cross link interference sensitivity may be quantized to a predetermined number of levels.

The number of digits for representing the cross link interference sensitivity is the number of digits necessary for representing the highest level of the cross link interference sensitivity.

Moreover, a carrier frequency, to which the cross link interference sensitivity vector applies, may be signaled to the network control device.

According to a third aspect, an apparatus is provided which comprises at least one processor and at least one memory including computer program code, the at least one memory and the computer program code configured to, with the at least one processor, cause the apparatus at least to perform: preparing cross link interference sensitivity information, which indicates how sensitive the different slots are to cross link interference, in form of a cross link interference sensitivity vector having a length M being the number of slots, wherein a k-th element of the cross link interference sensitivity vector indicates a cross link interference sensitivity in the k-th slot, wherein $1<=k<=M$, and signaling the cross link interference sensitivity vector to a network control device.

According to a fourth aspect, a method is provided which comprises: preparing cross link interference sensitivity information, which indicates how sensitive the different slots are to cross link interference, in form of a cross link interference sensitivity vector having a length M being the number of slots, wherein a k-th element of the cross link interference sensitivity vector indicates a cross link interference sensitivity in the k-th slot, wherein $1<=k<=M$, and signaling the cross link interference sensitivity vector to a network control device.

The third and fourth aspects may be modified as follows:
The cross link interference sensitivity may be quantized to a predetermined number of levels.

The number of digits for representing the cross link interference sensitivity may be the number of digits necessary for representing the highest level of the cross link interference sensitivity.

Moreover, a carrier frequency, to which the cross link interference sensitivity vector applies, may be signaled to the network control device.

According to a fifth aspect, an apparatus is provided which comprises at least one processor and at least one memory including computer program code, the at least one memory and the computer program code configured to, with the at least one processor, cause the apparatus at least to perform: receiving supported slot format information concerning radio frame configuration in form of a list in which supported slot formats for TDD are listed from a network control device, and receiving used radio frame configuration information in form of a vector which has a length M which is the number of slots from the network control device, wherein an i-th element of the vector indicates the used slot format in the i-th slot by a number indicating an entry in the list of the supported slot format information, wherein $1<=i<=M$.

According to a sixth aspect, a method is provided which comprises:

receiving supported slot format information concerning radio frame configuration in form of a list in which supported slot formats for TDD are listed from a network control device, and receiving used radio frame configuration information in form of a vector which has a length M which is the number of slots from the network control device, wherein an i-th element of the vector indicates the used slot format in the i-th slot by a number indicating an entry in the list of the supported slot format information, wherein $1<=i<=M$.

The fifth and sixth aspects may be modified as follows:

The supported slot formats in the list of the supported slot format information may be a subset from a plurality of predefined slot formats.

The number of supported slot formats in the supported slot format information may be N, and the number indicating an entry in the list of the supported slot format information may be represented by digits, the number of which is the number of digits necessary for representing N.

Furthermore, cross link interference sensitivity information, which indicates how sensitive the different slots are to cross link interference, may be received in form of a cross link interference sensitivity vector from the network control device, the cross link interference sensitivity vector having a length M, wherein a k-th element of the cross link interference sensitivity vector indicates a cross link interference sensitivity in the k-th slot, wherein $1<=k<=M$, and a slot format may be applied based on the received cross link interference sensitivity information.

The cross link interference sensitivity may be quantized to a predetermined number of levels.

The number of digits for representing the may be the number of digits necessary for representing the highest level of the cross link interference sensitivity.

Moreover, a carrier frequency, to which the cross link interference sensitivity vector applies, may be received from the network control device.

According to a seventh aspect, an apparatus is provided which comprises at least one processor and at least one memory including computer program code, the at least one memory and the computer program code configured to, with the at least one processor, cause the apparatus at least to perform: receiving cross link interference sensitivity information, which indicates how sensitive the different slots are to cross link interference, in form of a cross link interference sensitivity vector from a network control device, the cross link interference sensitivity vector having a length M being the number of slots, wherein a k-th element of the cross link interference sensitivity vector indicates a cross link interference sensitivity in the k-th slot, wherein $1<=k<=M$, and applying a slot format based on the received cross link interference sensitivity information.

According to an eighth aspect, a method is provided which comprises: receiving cross link interference sensitivity information, which indicates how sensitive the different slots are to cross link interference, in form of a cross link interference sensitivity vector from a network control device, the cross link interference sensitivity vector having a length M being the number of slots, wherein a k-th element of the cross link interference sensitivity vector indicates a cross link interference sensitivity in the k-th slot, wherein $1<=k<=M$, and applying a slot format based on the received cross link interference sensitivity information.

The seventh and eighth aspects may be modified as follows:

The cross link interference sensitivity may be quantized to a predetermined number of levels.

The number of digits for representing the may be the number of digits necessary for representing the highest level of the cross link interference sensitivity.

Furthermore, a carrier frequency, to which the cross link interference sensitivity vector applies, may be received from the network control device.

According to a ninth aspect of the present invention a computer program product is provided which comprises code means for performing a method according to any one of the second, fourth, sixth and eighth aspects and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to a tenth aspect an apparatus is provided which comprises means for preparing supported slot format information concerning radio frame configuration in form of a list in which supported slot formats for TDD are listed, signaling the supported slot format information to a network control device, means for preparing used radio frame configuration information in form of a vector which has a length M which is the number of slots, wherein an i-th element of the vector indicates the used slot format in the i-th slot by a number indicating an entry in the list of the supported slot format information, wherein $1<=i<=M$, and means for signaling the used radio frame configuration information to the network control device.

According to an eleventh aspect, an apparatus is provided which comprises means for preparing cross link interference sensitivity information, which indicates how sensitive the different slots are to cross link interference, in form of a cross link interference sensitivity vector having a length M being the number of slots, wherein a k-th element of the cross link interference sensitivity vector indicates a cross link interference sensitivity in the k-th slot, wherein $1<=k<=M$, and means for signaling the cross link interference sensitivity vector to a network control device.

According to a twelfth aspect, an apparatus is provided which comprises means for receiving supported slot format information concerning radio frame configuration in form of a list in which supported slot formats for TDD are listed from a network control device, and means for receiving used radio frame configuration information in form of a vector which has a length M which is the number of slots from the network control device, wherein an i-th element of the vector indicates the used slot format in the i-th slot by a number indicating an entry in the list of the supported slot format information, wherein 1<=i<=M.

According to a thirteenth aspect, an apparatus is provided which comprises means for receiving cross link interference sensitivity information, which indicates how sensitive the different slots are to cross link interference, in form of a cross link interference sensitivity vector from a network control device, the cross link interference sensitivity vector having a length M being the number of slots, wherein a k-th element of the cross link interference sensitivity vector indicates a cross link interference sensitivity in the k-th slot, wherein 1<=k<=M, and means for applying a slot format based on the received cross link interference sensitivity information.

BRIEF DESCRIPTION OF THE DRAWINGS

These and other objects, features, details and advantages will become more fully apparent from the following detailed description of embodiments which is to be taken in conjunction with the appended drawings, in which:

FIG. 4 shows slot formats for normal cyclic prefix (table 4.3.2-3 of 3GPP TS 38.211).

DETAILED DESCRIPTION OF EMBODIMENTS

In the following, description will be made to example embodiments. It is to be understood, however, that the description is given by way of example only, and that the described embodiments are by no means to be understood as limiting embodiments thereto.

Embodiments are related to 5G NR TDD mode, and addresses the problem of how to efficiently signal the used radio frame configuration between two gNBs over the Xn interface. In addition to signaling of the radio frame configuration, also signaling of a so-called cross link interference sensitivity vector is proposed that add additional benefits. How to efficiently design such new signaling procedures present a new problem, given the highly flexible frame structure for the 5G NR design. Especially as it needs to be scalable to cover cases ranging from tightly coordinated static/semi-static TDD operation over agile dynamic TDD cases. Embodiments are applicable also for inter-operator use cases.

Before describing embodiments in detail, the problem underlying the present application is described in some more detail.

The 5G NR frame structure is designed to be highly flexible. A radio frame is 10 ms, and consists of a series of 1 ms subframes. Each frame is divided into two equally-sized half-frames of five subframes, each with half-frame 0 consisting of subframes 0-4 and half-frame 1 consisting of subframes 5-9. A slot consists of 14 OFDM symbols for cases with normal cyclic prefix, while it equals only 12 OFDM symbols for the case with extended cyclic prefix and subcarrier spacing of 60 kHz. The number of slots per subframe/radio frame depends on the subcarrier spacing. For 15 kHz there is one slot per subframe, for 30 kHz there are two slots per subframe, for 60 kHz there are four slots per subframe, and so forth.

A larger number of possible slot formats are defined in the table shown in FIG. 4 (source: 3GPP TS 38.211-Table 4.3.2-3, which shows slot formats for normal cyclic prefix), where "D" indicates downlink symbol, "U" indicates uplink symbol, and "X" is flexible. Hence, "X" could refer to muting or be used for downlink or uplink transmission. As an example, slot format 0 and 1 corresponds to downlink-only and uplink-only slots, respectively. Slot format 36 contain first three downlink transmission symbols, followed by "X" (which could be set to mute for guard period), and ten uplink transmissions.

As per 3GPP TS 38.213, the gNB may inform the UEs of the (currently) used slot format. See more information in 3GPP TS 38.213, clause 11.1.

It is assumed that for each cell, parameterization of the subcarrier spacing, cyclic prefix length (normal or extended), carrier frequency, carrier bandwidth are "static" or "semi-static" settings that are seldom adjusted. It is therefore assumed that a gNB can signal settings of the aforementioned parameters as part of the XnAP procedure "NG-RAN node Configuration Update" as defined in 3GPP TS 38.423.

Given the parameterization of those, one 10 ms radio frame will consist of M slots, where M=10 for 15 kHz SCS, M=20 for 30 kHz, M=40 for 60 kHz SCS, and so forth.

Some embodiments aim to efficiently designing an inter-gNB signaling procedure for radio frame configuration and related CLI sensitivity information sharing. This is particularly challenging as it needs to be scalable to cover cases ranging from tightly coordinated static/semi-static TDD operation over agile dynamic TDD cases. What is proposed according to embodiments lays the very basic foundation for building more advanced Xn-based TDD coordination procedures. Embodiments address both the case where the Xn-based information exchange is between two gNBs having cells operating at the same carrier frequency, as well as between gNBs (could be from different operators) that may use different carrier frequencies. The latter is e.g. relevant for cases where two operators may be using adjacent carriers in the same band such as for instance the 3.5 GHz band.

In the following, a general overview of some embodiments is described by referring to FIGS. 1, 2A, 2B, 3A and 3B.

Figure 1:
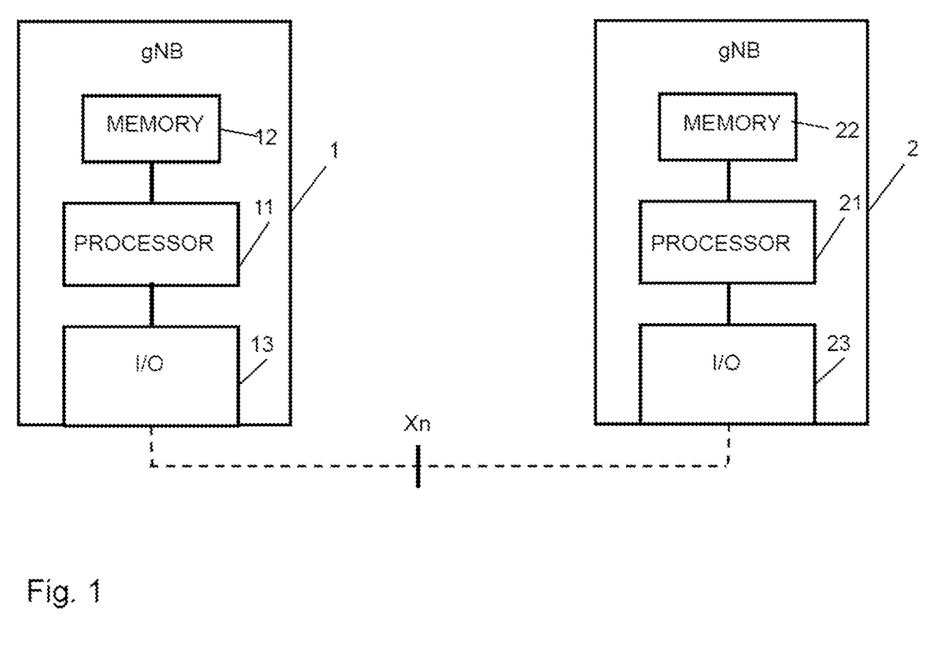
FIG. 1 shows gNBs 1 and 2 according an embodiment.
Figure 2A:
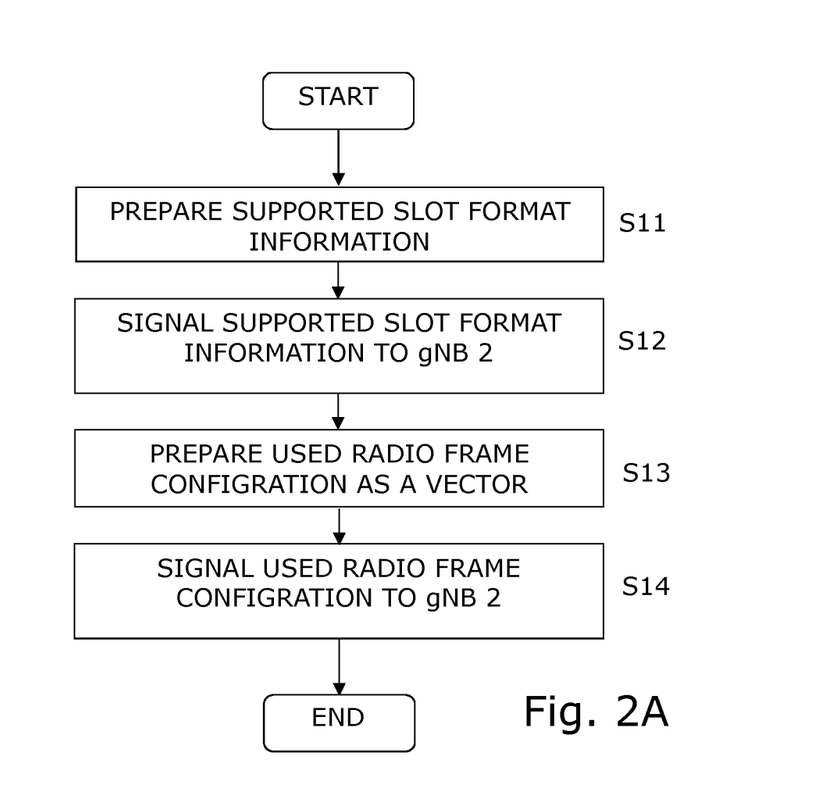
FIG. 2A shows a flowchart of a procedure carried out by the gNB 1 according to an embodiment.
Figure 2B:
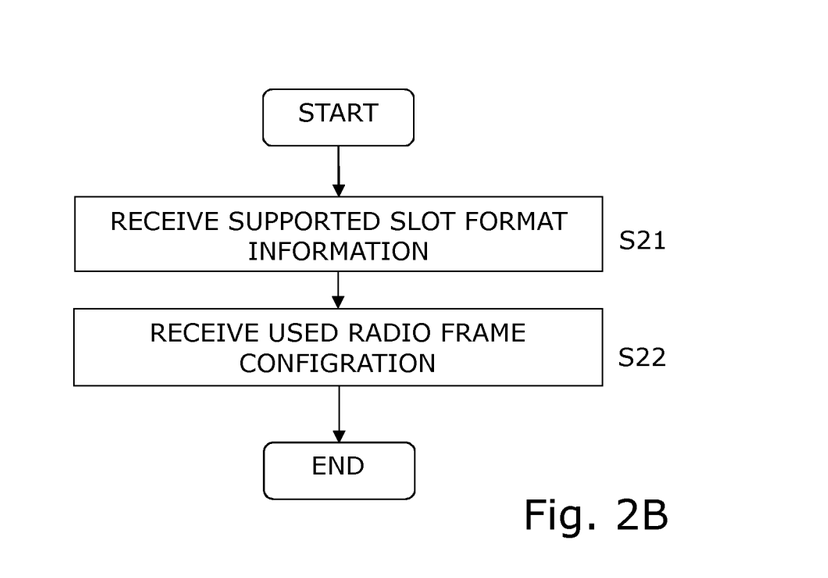
FIG. 2B shows a flowchart of a procedure carried out by the gNB 2 according to an embodiment.

In particular, FIG. 1 shows gNBs 1 and 2 as examples for a first apparatus according to the present embodiment. However, embodiments are not limited to a gNB, and the apparatus can be any kind of network control device, such as a base station, which controls a radio connection to a user equipment by using a TDD radio frame configuration. In the example of FIG. 1 it is assumed that the gNB 1 signals a TDD radio configuration to the gNB 2. Moreover, FIG. 2A illustrates a process carried out by the gNB 1, and FIG. 2B illustrates a process carried out by the gNB 2.

The gNB 1 comprises at least one processor 11 and at least one memory 12 including computer program code. The at least one processor 11, with the at least one memory 12 and the computer program code, is configured to cause the apparatus to perform: preparing supported slot format information concerning radio frame configuration in form of a list in which supported slot formats for TDD are listed, as shown in step S11 of FIG. 2A, signaling the supported slot format information to a network control device (e.g., gNB 2), as shown in step S12, preparing used radio frame configuration information in form of a vector which has a length M which is the number of slots, wherein an i-th element of the vector indicates the used slot format in the i-th slot by a number indicating an entry in the list of the supported slot format information, wherein 1<=i<=M, as shown in step S13, and signaling the used radio frame configuration information to the network control device, as shown in step S14.

The gNB 2 comprises at least one processor 21 and at least one memory 22 including computer program code. The at least one processor 21, with the at least one memory 22 and the computer program code, is configured to cause the apparatus to perform: receiving supported slot format information concerning radio frame configuration in form of a list in which supported slot formats for TDD are listed from a network control device (e.g., gNB 1), as shown in steps S21 of FIG. 2B, and receiving used radio frame configuration information in form of a vector which has a length M which is the number of slots from the network control device, as shown in step S22, wherein an i-th element of the vector indicates the used slot format in the i-th slot by a number indicating an entry in the list of the supported slot format information, wherein 1<=i<=M.

In this way, the network control devices (gNBs 1 and 2) can exchange the supported slot formats beforehand, and for signaling actually used slot formats, it is only necessary to signal the vector including the used radio frame configuration, which refers to the supported slot format information beforehand. Hence, it is not necessary to explicitly indicate the full amount of supported slot formats each time another network control device has to be informed about the used radio frame configuration.

Moreover, the supported slot formats in the list of the supported slot format information may be a subset from a plurality of predefined slot formats (e.g., predefined slot formats as shown the table of FIG. 4).

When the number of supported slot formats in the supported slot format information is N, the number indicating an entry in the list of the supported slot format information may be represented by digits, the number of which is the number of digits necessary for representing N.

Thus, the number of digits (or bits) used for representing N may be smaller than that for representing all possible slot formats. Hence, overhead from signaling between the two network control devices (gNBs 1 and 2) can be reduced.

It is noted that the gNBs 1 and 2 (or the corresponding apparatus) may further comprise input/output (I/O) units or functions (interfaces) 13, 23 connected to the processor 11, 21, in order to provide connections to other elements. In particular, a connection between the gNBs 1 and 2 may be provided via interface Xn.

Moreover, according to another embodiment, in addition to signaling used radio frame configuration or instead thereof, also information concerning cross link interference (CLI) sensitivity may be exchanged. This is described by referring to the flow charts shown in FIGS. 3A and 3B.

Figure 3A:
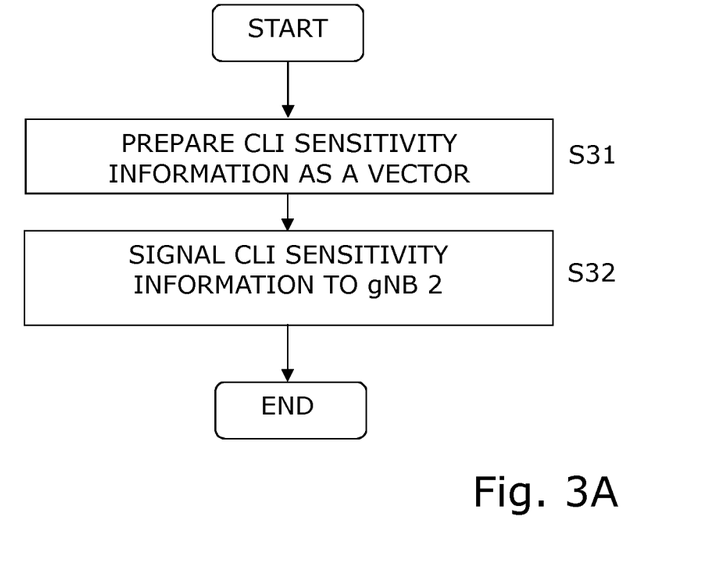
FIG. 3A shows a flowchart of a procedure carried out by the gNB 1 according to a further embodiment.

For example, the gNB 1 may prepare cross link interference sensitivity information in form of a cross link interference sensitivity vector having a length M being the number of slots, as shown in step S31 of FIG. 3A, wherein a k-th element of the cross link interference sensitivity vector indicates a cross link interference sensitivity in the k-th slot, wherein 1<=k<=M, and signal the cross link interference sensitivity vector to a network control device (e.g., gNB 2), as shown in step S32.

Figure 3B:
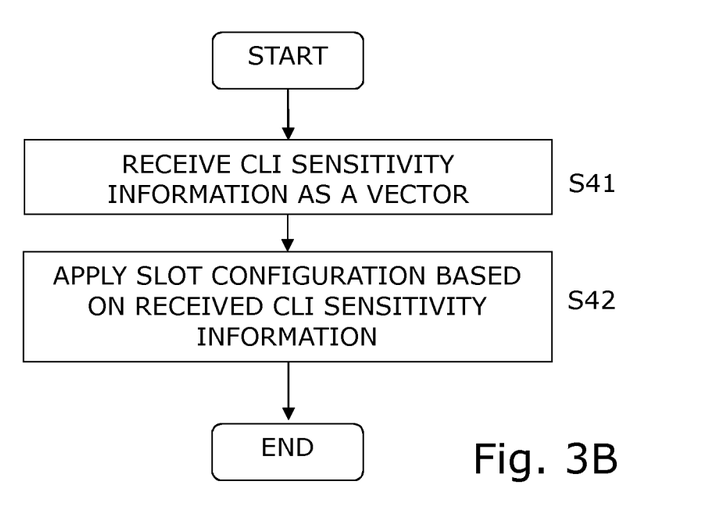
FIG. 3B shows a flowchart of a procedure carried out by the gNB 2 according to a further embodiment.

Moreover, as shown in FIG. 3B, the gNB 2 may receive cross link interference sensitivity information in form of a cross link interference sensitivity vector from a network control device (e.g., gNB 1), as shown in step S41 of FIG. 3B, the cross link interference sensitivity vector having a length M being the number of slots, wherein a k-th element of the cross link interference sensitivity vector indicates a cross link interference sensitivity in the k-th slot, wherein 1<=k<=M, and apply a slot format based on the received cross link interference sensitivity information, as shown in step S42.

In this way, the cross link interference sensitivity information can efficiently be exchanged between the network control devices (gNBs).

In the following, the above embodiments are described in more detail.

In particular, it can be assumed that most gNB implementations may likely not implement and utilize all slot formats. Therefore, it is proposed that gNB could be made to only support a subset of those. In the simplest form, this could be supported for slot format 0 (downlink-only subframe) and slot format 1 (uplink-only subframe). It is therefore proposed that the gNb should be able to signal a list of the N supported slot formats as part of the XnAP procedure "NG-RAN node Configuration Update".

The N supported slot formats for the gNB (or cell at the gNB) may be denoted by the vector [SupportedSlotFormat_1, SupportedSlotFormat_2, . . . , SupportedSlotFormat_N], where SupportedSlotFormat_x$\in$[0, 1, 2, . . . 255] as per the NR slot formats defined by 3GPP in TS 38.211.

Given the supported slot formats, the used radio frame configuration can be signaled from one gNB to another with a vector of length M, where the i-th element (1$\leq$i$\leq$M) of that vector equals either one of elements of the supported slot format vector. By doing this, there is a scalable solution, where the overhead from inter-gNB signaling of radio frame configuration is optimized.

Example #1

If there are M slots per radio frame, and if the index of the used (from the full set of slot formats) is fully signalled, it would require M×8 bits. However, according to the proposed scheme, the number of required bits for such signaling is reduced to M×W, where W=log2(N). So if a gNB e.g. only uses/implements N=4 of the possible slot formats, only M×2 bits are needed for radio frame configuration signaling, as compared to M×8 bits, corresponding to a factor four reduction of the required bandwidth the for signaling.

As a concrete example, a case is assumed in which 10 slots are used, and only two slot formats, namely 0 and 1, are supported. Then, the list or vector of the supported formats would be as follows: [0, 1]. The vector of the used radio frame configuration could then be for example as follows: [1, 1, 0, 0, 1, 0, 1, 0, 1, 1]. This indicates, for example, that in the third slot, slot format 0 (only downlink, see the table shown in FIG. 4) is applied, and in the tenth slot, slot format 1 (only uplink) is applied. As shown, for each entry in the vector of the used radio frame configuration only 1 bit is required.

Signaling of the radio frame configuration could be included as an IE in the XnAP procedure "NG-RAN node Configuration Update". When a gNB signals the used radio frame configuration (as per above mentioned method), it is implicitly assumed that the gNB complies with that radio frame configuration, until the gNB indicates differently.

In addition to the proposed radio frame configuration signaling, it is proposed to allow the gNb to also signal a corresponding cross link interference (CLI) sensitivity vector. The CLI sensitivity vector also has length M, and is intended to inform other gNBs how sensitive the different slots (in the radio frame configuration) are to CLI. That is, if highly sensitive to CLI, surrounding gNBs should strongly prioritize use similar slot format as this would minimize the CLI. On the contrary, if the sensitivity is indicated as being low, it means that neighboring gNB(s) could pay less attention to using same slot format. For the sake of simplicity, it is proposed to quantize the sensitivity level to three levels, denoted as High, Medium, Low. But, the scheme could of course be further generalized to allow more levels if deemed necessary.

By default, the CLI sensitivity vector expresses the CLI sensitivity for co-channel deployed gNBs, i.e. gNBs having cells with same carrier frequencies. However, to broaden the scope of applicability also to inter-operator cases where e.g. two gNBs are using different carrier frequencies, it should be possible for the gNB to add an attribute to the signaling of the CLI sensitivity vector as follows: When an gNB signal the CLI sensitivity vector to another gNB, it should have the option of including a carrier frequency, fc, for which this sensitivity vector applies. If fc is not included, it is by default referring to the co-channel carrier frequency that the gNB sending the message is using. In this context, note that from the previous sections, it is assumed that a gNB signal settings of the used carrier frequency for its cell(s) as part of the XnAP procedure "NG-RAN node Configuration Update", so such information is known by the gNBs prior to signaling of the CLI sensitivity vector.

In the following, it is further described by examples how the proposed signaling frame work can be used for in different settings/use cases.

Example #2: Semi-Static TDD on Slot Resolution

In this example, a case is considered where TDD switching is implemented on a per slot granularity, and is following certain switching pattern. For this case, only slot formats 0 and 1 will be used, and hence the allowed slot format vector will equal [0,1]. It only takes one bit per slot to indicate if a slot equals slot format 0 or 1, and hence the signaling of radio frame configuration requires only M bits (M is the number of slots per radio frame). If the deployment of the gNB's is such that CLI is hardly acceptable, the corresponding CLI sensitivity vector could be set to [High, High, High, . . . , High]. This would indicate that other gNBs should strive to using the same radio frame configuration as generation of CLI should be avoided. On the other hand, if the gNB could tolerate some CLI in certain slots, it could signal a CLI sensitivity vector of (example only) [High, Low, Low, High, High, High, . . . , High]. The indication of "Low" for slots number 1 and 2 in this example indicates that it is not critical if other gNBs generate some CLI during those slots. This could e.g. be acceptable if the gNB anyways does not plan to schedule any users in those slots, or users that anyways experience high SINR values, such that additional CLI from surround a gNB is acceptable.

Example #3: Unrestricted Fully Dynamic TDD Operation

Another extreme case is the situation where a gNB operates in a fully dynamic TDD mode without any restrictions. In such cases, the gNB could in principle decide on the used slot format configuration on the fly. Such situations are supported by the suggested frame work, by simply indicating that the supported slot format is 2. Note that slot format 2 contain all "X" for all symbols, and hence cover all feasible combinations "D" and "U" symbol options. Hence, when slot format 2 is signaled (e.g. as part of the XnAP procedure "NG-RAN node Configuration Update" procedure) as the only allowed slot format used by the gNB, there is no need for also signaling the radio frame configuration, nor for signaling the CLI sensitivity vector as it has no meaning in this example.

Example #4: Frequent TDD Switching for URLLC-Alike Services

For cases with URLLC, e.g. demanding the strictest latency requirements of 1 ms and 99.999% reliability, TDD switching will likely have to be conducted on a faster time-resolution than slot level resolution. Essentially calling also for cases with intra-slot switching between downlink and uplink transmissions. The ultra-reliability constraint, calls for both ultra-reliable PHY control and data channel transmissions. For achieving one-way downlink URLLC performance, a downlink heavy slot format such as slot format 31 is attractive. That slot format has downlink symbols in the start, followed by two uplink symbols in the end that e.g. can be used to carrier HARQ feedback, CSI reports, etc. Similarly, for achieving one-way uplink URLLC performance, an uplink heavy formats such as slot format 35 is attractive. If the gNB at the same time should be able to serve eMBB downlink and uplink users, also the downlink-only (slot format 0) and uplink-only (slot format 1) slot formats would be relevant. Hence, for this particular case, the vector with Allowed Slot Formats would equal:

[Slot format 0, Slot format 1, Slot format 31, Slot format 35]

Hence, 2 bits are needed for signaling the used slot format for each the slots in the radio frame configuration. For many industrial control applications (where URLLC is of relevance), the need for transmissions are periodical with known timings. Thus, if at occasions where DL URLLC is expected, radio frame configuration is set to use slot format 31 at such times, and slot format 35 when UL URLLC transmissions are expected. The CLI sensitivity vector is set to High for the slots in the radio frame configuration where either downlink or uplink URLLC transmission are expected, and hence protecting those from CLI.

Example #5: Access and Control Signaling Protection

For the system to perform properly, access to the system is naturally important, as well as related control signaling. For the downlink, it is important that UEs can reliably detect the cells, and also reliably receive paging messages when the network wants to establish a new call. Similarly, for the uplink, reliable random access is of importance. Thus, to accommodate the former, one could set the radio frame configuration to have regular occasions of downlink-only (Slot format 0) and uplink-only (Slot format 1) slots where such critical control can be guaranteed, by also setting the CLI sensitivity vector to "High" for those slots.

Example #6: Inter-Operator Scenario

Another relevant use case where the proposed inter-gNB signaling scheme is applicable is for the inter-operator scenario. A relevant scenario is e.g. the deployment where two (or more) operators have been granted frequency spectrum on neighbouring carriers in 3.5 GHz spectrum band. For such cases, the gNBs of operator A and B may be informed from OAM of which carrier frequencies they are both using, or such information could be exchanged by the gNBs via the XnAP procedure "NG-RAN node Configuration Update" procedure as mentioned also earlier. The gNBs of operator A and B can also signal their supported slot formats, used radio frame configuration, and CLI sensitivity vector. When a gNB from operator A signals the CLI sensitivity vector to a gNB of operator B, it will append the fc attribute, corresponding the carrier frequency of the receiving gNB, for which this CLI sensitivity vector applies. Note that a gNB may signal multiple CLI sensitivity vectors to a neighboring gNB as gNBs may host multiple cells operating at different carrier frequencies. Thus, a gNB of operator B receives a CLI sensitivity vector from a gNB of operator A with "High" for some slots, it indicates that operator A and B shall preferably use align slot formats for those particular slots.

Additional inter-gNB information exchange:

It shall be noted that the gNB information exchange schemes presented in some embodiments could be completed with other information. Examples include various UE and gNB measurements, etc. Hence, this is not excluded.

As illustrated with the above examples, the proposed solution is applicable for many relevant use cases, and addresses the identified problem. The solution fully captures the numerous flexibility/configuration options offered by the new 3GPP NR frame structure, etc., and the proposed solution has rather low complexity.

Embodiments are not limited to the examples as given before.

For example, according to some embodiments described above, the supported slot format information and the used radio frame configuration are exchanged between the gNBs in the XnAP procedure "NG-RAN node Configuration Update" via the Xn interface. However, the embodiments are not limited to this procedure, and the corresponding information may be exchanged by another suitable procedure.

Moreover, according to some embodiments described above, the CLI sensitivity information is exchanged in addition to the exchange of the supported slot format information and the used radio frame configuration. However, the embodiment of the present application are not limited to this, and the exchange of the CLI sensitivity information may be carried out independently from the exchange of the supported slot format information and the used radio frame configuration. For example, according to some embodiments, the exchange of the supported slot format information and the used radio frame configuration may not be carried out.

Names of network elements, protocols, and methods are based on current standards. In other versions or other technologies, the names of these network elements and/or protocols and/or methods may be different, as long as they provide a corresponding functionality.

In general, the example embodiments may be implemented by computer software stored in the memory (memory resources, memory circuitry) 12, 22 and executable by the processor (processing resources, processing circuitry) 11, 21, or by hardware, or by a combination of software and/or firmware and hardware.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory (memory resources, memory circuitry) 12, 22 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processor (processing resources, processing circuitry) 11, 21 may be of any type suitable to the local technical environment, and may include one or more of general purpose computers, special purpose computers, microprocessors, digital signal processors (DSPs) and processors based on a multi core processor architecture, as non-limiting examples.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus comprising at least one processor and at least one memory including computer program code, the at least one memory and the computer program code configured to, with the at least one processor, cause the apparatus at least to:
prepare supported slot format information concerning radio frame configuration in form of a list in which supported slot formats for time division duplexing are listed, signal the supported slot format information from a first network control device to a second network control device, prepare used radio frame configuration information in form of a vector which has a length M which is a number of slots, wherein an i-th element of the vector indicates the used slot format in the i-th slot by a number indicating an entry in the list of the supported slot format information, wherein $1<=i<=M$, and signal the used radio frame configuration information from the first network control device to the second network control device.

2. The apparatus according to claim 1, wherein the supported slot formats in the list of the supported slot format information are a subset from a plurality of predefined slot formats.

3. The apparatus according to claim 1, wherein:
the number of supported slot formats in the supported slot format information is N, and
the number indicating an entry in the list of the supported slot format information is represented by digits, the number of which is the number of digits necessary for representing N.

4. The apparatus according to claim 1, wherein the at least one memory and the computer program code are further configured to, with the at least one processor, cause the apparatus to:
prepare cross link interference sensitivity information, which indicates how sensitive different slots are to cross link interference, in form of a cross link interference sensitivity vector, the cross link interference sensitivity vector having a length M, wherein a k-th element of the cross link interference sensitivity vector indicates a cross link interference sensitivity in the k-th slot, wherein $1<=k<=M$, and
signal the cross link interference sensitivity vector from the first network control device to the second network control device.

5. The apparatus according to claim 4, wherein the cross link interference sensitivity is quantized to a predetermined number of levels.

6. The apparatus according to claim 5, wherein a number of digits for representing the cross link interference sensitivity is the number of digits necessary for representing the highest level of the cross link interference sensitivity.

7. The apparatus according to claim 4, wherein the at least one memory and the computer program code are further configured to, with the at least one processor, cause the apparatus to:
signal a carrier frequency, to which the cross link interference sensitivity vector applies, from the first network control device to the second network control device.

8. An apparatus comprising at least one processor and at least one memory including computer program code, the at least one memory and the computer program code configured to, with the at least one processor, cause the apparatus to:
prepare cross link interference sensitivity information, which indicates how sensitive different slots are to cross link interference, in form of a cross link interference sensitivity vector having a length M being a number of slots, wherein a k-th element of the cross link interference sensitivity vector indicates a cross link interference sensitivity in the k-th slot, wherein $1<=k<=M$, and signal the cross link interference sensitivity vector from a first network control device to a second network control device.

9. The apparatus according to claim 8, wherein the cross link interference sensitivity is quantized to a predetermined number of levels.

10. The apparatus according to claim 9, wherein a number of digits for representing the cross link interference sensitivity is the number of digits necessary for representing the highest level of the cross link interference sensitivity.

11. The apparatus according to claim 8, wherein the at least one memory and the computer program code are further configured to, with the at least one processor, cause the apparatus to:
signal a carrier frequency, to which the cross link interference sensitivity vector applies, from the first network control device to the second network control device.

12. An apparatus comprising at least one processor and at least one memory including computer program code, the at least one memory and the computer program code configured to, with the at least one processor, cause the apparatus at least to:
receive, from a first network control device by a second network control device, supported slot format information concerning radio frame configuration in form of a list in which supported slot formats for time division duplexing are listed, and
receive, from the first network control device by the second network control device, used radio frame configuration information in form of a vector which has a length M which is a number of slots, wherein an i-th element of the vector indicates the used slot format in the i-th slot by a number indicating an entry in the list of the supported slot format information, wherein $1<=i<=M$.

13. The apparatus according to claim 12, wherein the supported slot formats in the list of the supported slot format information are a subset from a plurality of predefined slot formats.

14. The apparatus according to claim 12, wherein:
the number of supported slot formats in the supported slot format information is N, and
the number indicating an entry in the list of the supported slot format information is represented by digits, the number of which is the number of digits necessary for representing N.

15. The apparatus according to claim 12, wherein the at least one memory and the computer program code are further configured to, with the at least one processor, cause the apparatus to:
receive, from the first network control device by the second network control device, cross link interference sensitivity information, which indicates how sensitive different slots are to cross link interference, in form of a cross link interference sensitivity vector, the cross link interference sensitivity vector having a length M, wherein a k-th element of the cross link interference sensitivity vector indicates a cross link interference sensitivity in the k-th slot, wherein $1<=k<=M$, and
apply a slot format based on the received cross link interference sensitivity information.

16. The apparatus according to claim 15, wherein the cross link interference sensitivity is quantized to a predetermined number of levels.

17. The apparatus according to claim 16, wherein a number of digits for representing the is the number of digits necessary for representing the highest level of the cross link interference sensitivity.

18. The apparatus according to claim 15, wherein the at least one memory and the computer program code are further configured to, with the at least one processor, cause the apparatus to:
receive, from the first network control device by the second network control device, a carrier frequency, to which the cross link interference sensitivity vector applies.

19. An apparatus comprising at least one processor and at least one memory including computer program code, the at least one memory and the computer program code configured to, with the at least one processor, cause the apparatus at least to:
receive, from a first network control device by a second network control device, cross link interference sensitivity information, which indicates how sensitive different slots are to cross link interference, in form of a cross link interference sensitivity vector, the cross link interference sensitivity vector having a length M being a number of slots, wherein a k-th element of the cross link interference sensitivity vector indicates a cross link interference sensitivity in the k-th slot, wherein $1<=k<=M$, and
apply a slot format based on the received cross link interference sensitivity information.

20. The apparatus according to claim 19, wherein the cross link interference sensitivity is quantized to a predetermined number of levels.

21. The apparatus according to claim 20, wherein number of digits for representing the is the number of digits necessary for representing the highest level of the cross link interference sensitivity.

22. The apparatus according to claim 19, wherein the at least one memory and the computer program code are configured to, with the at least one processor, cause the apparatus to:
receive, from the first network control device by the second network control device, a carrier frequency, to which the cross link interference sensitivity vector applies.

* * * * *